United States Patent [19]

Laue

[11] Patent Number: 5,606,790

[45] Date of Patent: Mar. 4, 1997

[54] METHOD OF MAKING A TWO PIECE PEDAL ROD

[75] Inventor: Charles E. Laue, 1041 Pawnee Rd., Wilmette, Ill. 60091

[73] Assignee: Charles E. Laue, Arlington Heights, Ill.; Patent Trust of 7/15/94

[21] Appl. No.: 392,238

[22] Filed: Feb. 22, 1995

Related U.S. Application Data

[60] Division of Ser. No. 177,952, Jan. 6, 1994, Pat. No. 5,425,286, which is a continuation-in-part of Ser. No. 45,654, Apr. 9, 1993, Pat. No. 5,429,014.

[51] Int. Cl.$^6$ ................................................. B21D 39/00
[52] U.S. Cl. ............................... 29/517; 29/525; 403/274
[58] Field of Search .......................... 29/511, 517, 525; 403/274, 282

[56] References Cited

U.S. PATENT DOCUMENTS

| | | | |
|---|---|---|---|
| 1,196,524 | 8/1916 | Cluett | 74/586 |
| 1,693,839 | 12/1928 | Faudi | 29/517 |
| 1,797,691 | 3/1931 | Merrill | 403/274 |
| 1,823,158 | 9/1931 | Mogford et al. | 403/274 |
| 2,663,270 | 12/1953 | Friedly | 29/517 |
| 2,701,733 | 11/1955 | Hauer et al. | 29/157 |
| 2,880,021 | 3/1959 | White | 403/282 |
| 3,274,671 | 9/1966 | Frevik et al. | 74/586 |
| 3,496,800 | 2/1970 | Brezinski | 74/586 |
| 3,623,442 | 11/1971 | Willis | 113/1214 |
| 3,762,042 | 10/1973 | Abe et al. | 29/598 |
| 3,786,695 | 1/1974 | Barett | 74/5862 |
| 4,012,967 | 3/1977 | Warren | 74/586 |
| 4,146,340 | 3/1979 | Smith | 74/586 |
| 4,218,156 | 8/1980 | Logan | 403/320 |
| 4,295,389 | 10/1981 | Geisthoff et al. | 74/586 |
| 4,317,355 | 3/1982 | Hatsuno et al. | 72/342 |
| 4,399,682 | 8/1983 | Hackett | 72/359 |
| 4,497,866 | 2/1985 | Petterson et al. | 402/343 |
| 4,523,872 | 6/1985 | Arena | 29/517 |
| 4,602,892 | 7/1986 | Brookstein et al. | 74/502.5 |
| 4,667,530 | 5/1987 | Mettler et al. | 74/586 |
| 4,684,284 | 8/1987 | Bradley | 403/320 |
| 4,700,446 | 10/1987 | Schmid et al. | 29/159.2 |
| 4,714,262 | 12/1987 | Wood | 74/596 |
| 4,763,922 | 8/1988 | Nishikawa | 29/517 |
| 4,787,771 | 11/1988 | Allen | 403/343 |
| 4,901,426 | 2/1990 | Laue | 29/510 |
| 4,953,894 | 9/1990 | Broszat et al. | 74/522 |
| 4,967,584 | 11/1990 | Sato et al. | 72/356 |
| 4,970,887 | 11/1990 | Lorieux | 72/356 |
| 4,993,864 | 2/1991 | Gjertsen et al. | 403/343 |
| 5,026,254 | 6/1991 | Ford et al. | 74/586 |
| 5,072,655 | 12/1991 | Adler | 403/274 |

FOREIGN PATENT DOCUMENTS

| | | | |
|---|---|---|---|
| 937424 | 11/1973 | Canada | 74/586 |
| 352360 | 7/1931 | United Kingdom | 403/343 |

Primary Examiner—David P. Bryant
Attorney, Agent, or Firm—Hill, Steadman & Simpson

[57] ABSTRACT

A method of making a pedal rod of two separate pieces is disclosed wherein a rod part and a head part are joined together by a crimped joint. The parts may be selectively plated and/or coated to provide environmental resistance or color coding.

4 Claims, 1 Drawing Sheet

U.S. Patent    Mar. 4, 1997    5,606,790
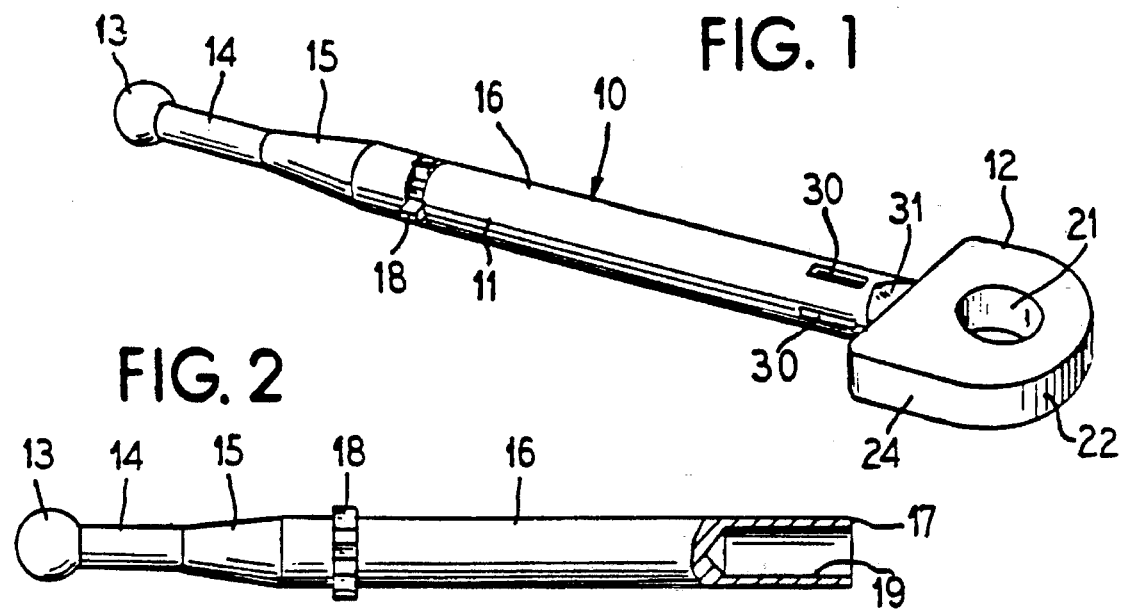
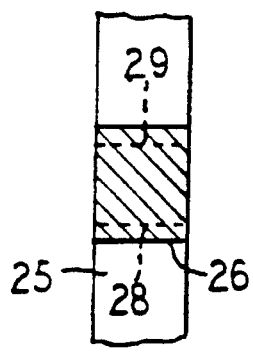 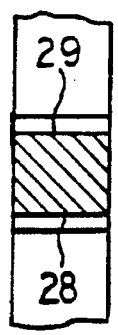 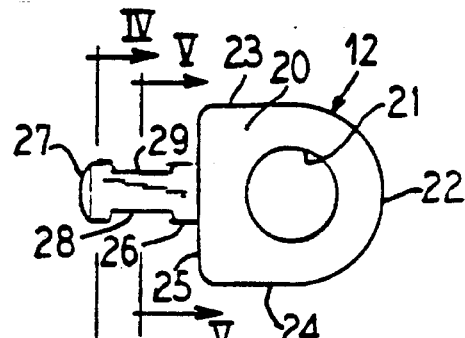
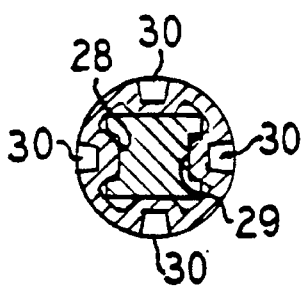 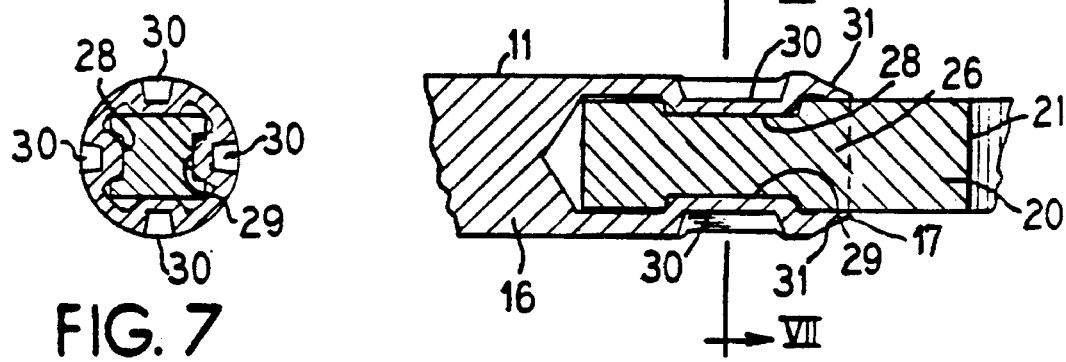

METHOD OF MAKING A TWO PIECE PEDAL ROD

RELATED APPLICATION

This application is a division of Ser. No. 08/177,952, filed Jan. 6, 1994, now U.S. Pat. No. 5,425,286, which is a continuation-in-part of Ser. No. 08/045,654 filed Apr. 9, 1993, now U.S. Pat. No. 5,429,014.

BACKGROUND OF THE INVENTION

1. Field of the Invention

This invention relates specifically to a pedal rod of the type utilized in the vehicular vehicle industry and wherein devices are actuated by an operator exerting force via a rod-like instrumentality interconnecting a foot or hand operated member and the operating mechanism of a vehicle such as the braking system of a car or truck.

2. The Prior Art

In my prior U.S. Pat. No. 4,901,426, I have disclosed and claimed the methods and equipment for forming threads or thread segments by pressing and without rotation in a pedal rod construction.

In my prior patent issuing on co-pending allowed application Ser. No. 07/833,665, now issued as U.S. Pat. No. 5,230,134, I have disclosed how the respective threaded portions of a mechanical joint may be formed in such a manner as to be matched or intentionally mismatched to afford a selective locking effect as two threadedly related parts are joined together.

In my parent application, of which the present disclosure is a continuation-in-part, Ser. No. 08/045,654 filed Apr. 9, 1993, it was contemplated that there be provided an adjustable, preset, threaded and torqued pedal rod assembled to a mean dimension supplied by the customer and then securely locked into firm assembly for utilization without further adjustment in the assembly line of the customer.

SUMMARY OF THE INVENTION

In accordance with the principles of the invention, it is contemplated that there be provided a two piece pedal rod which is strong and efficient and which can be quickly and conveniently manufactured with great economy, thereby providing a pedal rod unit which is price competitive and entirely reliable for its intended purpose.

The two separate pieces are a head part and a shaft part which are formed without any threads or screw thread segments whatsoever. Moreover, the head part may be made of a different material than the shaft part, thereby affording the possibility of selectively and independently plating or coating one or the other of the component elements of the pedal rod assembly, thereby to protectably enhance the resistance of the part to environmental factors such as rust and corrosion by road chemicals. Such coating or plating can also effect color coding. For example, by so treating the head part selectively with a colored plating operation the parts of different original equipment manufacturers may be distinguished from one another, even though the parts are produced on the same production line. Such optional plating operation can be effected without the risk of adversely affecting the assembly joints on the other part.

The two separate parts are permanently bonded into firm assembly with one another simply by press fitting and are locked together permanently by pressure crimping, thereby to provide a crimped joint having as many as six separate crimping elements.

DESCRIPTION OF THE DRAWINGS

FIG. 1 is a perspective view of a pedal rod unit constructed in accordance with the principles of the present invention.

FIG. 2 is an elevational view showing a side elevation of the shaft part of the present invention, but with parts broken away and with parts shown in cross-section to illustrate additional details of the features incorporated in the shaft part.

FIG. 3 is an elevational view showing in side elevation the head part of the present invention prior to its joinder in assembly with the shaft part.

FIG. 4 is a cross-sectional view taken on line IV—IV of FIG. 3 and showing additional details of the head part.

FIG. 5 is a cross-sectional view taken on line V—V of FIG. 3 and showing still additional structural features of the head part.

FIG. 6 is an enlarged fragmentary cross-sectional view showing the crimped joint after assembly of the two parts and the crimped joinder thereof.

FIG. 7 is a cross-sectional view taken on line VII—VII of FIG. 6.

DESCRIPTION OF THE PREFERRED EMBODIMENTS

This application is a continuation-in-part of my co-pending application Ser. No. 08/045,654 filed Apr. 9, 1993 entitled "Adjustable Pedal Rod and Method of Making Same."

It is believed that the method technology of the present invention and the preferred sequencing of the manufacturing techniques will be understood from the description which follows.

A metal bar stock can be employed to provide both of the two separate components, or two elements, of the pedal rod provided in accordance with this invention.

Thus, in the practice of the present invention, it is my objective to provide a pedal rod such as that illustrated in FIG. 1 and identified generally at 10. The pedal rod 10 consists of two separate elements or parts constituting a rod or shaft part 11 and a head part 12.

The head part 12 is a flat rolled steel exhibiting the characteristics 1010 to 1020, or 8620 steel. This material is particularly suitable for conducting automated punch press operations and I have found it to be particularly appropriate for use in making the head parts in accordance with the principles of the present invention. It should be understood of course, that persons of skill in the art might select a material of a different formulation which would not be a departure from the spirit of this invention. However, the specified material is designated as constituting the best mode of my discovery.

For the rod or shaft elements in the performance environment of an automotive braking assembly, I have selected material of Rockwell "B" 95-105 12L14 steel. That material I have found to be particularly appropriate for machining and stamping operations, especially when such operations are conducted on automated machinery as is generally contemplated in prescribing modern low cost manufacturing techniques.

Referring now to FIG. 2, the rod or shaft part is formed by machining a rod-shaped cylindrical work piece into an elongated cylindrically shaped body having a ball 13 at its free end, adapted to cooperate with the mechanism with which the pedal rod is associated. Extending axially away from the ball 13 is a reduced diameter shaft portion 14 which merges with a transition stage formed as an outwardly tapered section 15 and expanding to a larger diameter body portion which is of uniform diametral size throughout its length as shown at 16 and extending to the end of the work piece. The body portion 16 terminates in an end wall 17 which is disposed to extend radially.

As is disclosed in one of my earlier applications, it is contemplated that there be formed by a stamping step a spring seating shoulder 18, the formation of which is quickly and conveniently afforded by displacing the metal of the surface so that a plurality of projections form a seating shoulder extending radially outwardly of the body portion 16.

It will be appreciated that the only machining step required to finish the rod or shaft element 11 is form the ball 13 and its related transition portions and a seating recess 19 in the end wall 17 of the rod or shaft element 11. The step of forming recess 19 is accomplished by drilling and reaming the recess, for example, on a multiple spindle screw machine, which may also be used to form the ball 13. The recess 19 is essentially cylindrical in shape and extends inwardly of the end wall 17 on a center line axis of the rod or shaft part 11.

Turning now to FIGS. 3, 4 and 5, it will be noted that the head part 12 can be formed in a punch press operation simply by punching in a single stroke the configuration shown in FIG. 3, namely, by providing a main body portion 20 having a through opening 21 centrally disposed therein. A curved outer edge is shown at 22 disposed approximately in concentric spacing relative to the opening 21 and terminating in spaced parallel side walls 23 and 24.

The side walls 23 and 24 terminate in a flat planar end wall 25 from which projects at a central axial position a generally rectangular boss 26 having a rounded pilot end 27. The opposite sides of the boss 26 are notched as at 28 and 29, to provide a relief space in which crimped material may be displaced during a subsequent assembly operation. It should be understood that the boss 26 is sized and shaped so that it can be received within the recess 19. It is not cylindrical. Rather, it is essentially rectangular in cross-section. However, it can be fitted within the recess 19 for the purposes which will be described in greater detail.

It will be appreciated that the rod or shaft element 11 and the head part or element 12 constitute first and second parts which may be axially advanced selectively to successively engage the boss 26 into the recess 19, thereby to accomplish assembly of the two parts. This assembly can be accomplished mechanically and could be automated if so desired.

However, one of the features of the present invention is that the two different parts afford a technique of manufacture which enables selective color coding or plating to be accomplished without adversely affecting the integrity of the assembled parts.

For example, some automobile manufacturers desire to afford parts which are exposed to corrosion of road chemicals such as salt and other ice melting compounds with special protection. Such manufacturers require that the head part of the pedal rod assembly, especially, be plated or protectively coated, since it is the head part that projects outside of the protective assembly.

Since the head part 12 of the present invention is made as a completely separated part, and is even made of a material which is different than the material or stock from which the rod or shaft part 11 is made, it is possible to afford the original equipment manufacturer a plating or color coding option at a nominal cost, since the head parts can be separately plated, without any adverse effect on the structural and functional characteristics of the rod or shaft element, and without adding any cost to the manufacturing price of the rod or shaft element.

For example, the head parts may at this stage be subjected to a yellow die chromate plating procedure so that they will not only be protectively plated and given an increased protection against the potentially harmful effects of a tough operating environment but will also be very distinctively colored, thereby serving to clearly and unmistakably identify the particular pedal rod of which the plated head element is a part as that of a specific customer.

As disclosed in my parent application pedal rods are operatively connected in the actuating train of a motion mechanism actuated by the operator of a vehicle. The head shown at 12 is illustrated in a single bar form, although those versed in the art will readily recognize that the head 12 could also take the form of a clevis, a form of pedal rod configuration often used by foreign manufacturers of motor vehicles, or a so-called offset head, which some OEM automobile manufacturers prefer for space accommodation reasons.

In any event, once the head part 12 is ready for assembly to the rod or shaft part 11, the boss 26 is inserted into the recess 19. In this regard, the rounded end shown at 27 on the end of the boss 26 eases entry of the generally rectangularly shaped boss into the cylindrically shaped recess and facilitates the assembly, particularly if such assembly operation is being effected by automated machinery.

As will be evident from an inspection of FIGS. 6 and 7, the two parts are press fit together so that the end wall 17 of the part 11 seats snugly up against the wall 25 of the part 12 and the boss 26 extends fully and completely into the recess 19.

At this juncture, the first and second parts may be permanently bonded and assembled together by pressure crimping at as many as six separate locations. Thus in FIGS. 6 and 7, four circumferentially spaced crimps 30 are shown, each of which constitutes an axially extending elongated slot which displaces material inwardly from the outer part 11 into a bonding relation with the inwardly adjacent part 12. Since the assembly of the first and second parts relates the body portion of the rod or shaft part as an outer part surrounding an inner part provided by the boss of the second part, it should be noted how the material from the body portion 16, or outer part, is actually displaced radially inwardly into the notches 28 and 29 formed in the surface of the boss 26, or inner part. Further, the other two crimps displace material from the body portion 16 into close bonding relation with the surfaces of the boss 26, thereby placing the two parts in firm assembly with one another. To further insure good bonding, two additional spaced end crimps as shown at 31 may also be employed. The crimps 31 are disposed on diametrically opposite sides of the body 16 right at the end wall 17.

In effect, the crimped joint forms and functions as recess and detent means which operate to bond the inner and outer parts into an integrated unitary assembly so that the two parts constitute a single pedal rod unit exhibiting unusual strength and versatility, but capable of being produced on modern machinery at reduced cost.

Although various minor modifications might be suggested by those skilled in the art, it should be understood that I wish to embody within the scope of the patent warranted hereon all such modifications as reasonably and properly come within the scope of my contribution to the art.

I claim as my invention:

1. The method of forming a pedal rod which includes the steps of:

(a) forming a first part by shaping a first part work piece made of steel material to form an elongated body member having a cylindrical portion of a first predetermined dimensional size and having a ball at one end thereof and terminating in a radial end wall at the opposite end, said body member including a smaller second cylindrical portion adjacent said ball and including a tapered portion joining said first and second cylindrical portions, (b) forming a recess on a center line axis in the opposite end of said first part by drilling and reaming the end wall, whereby said first part defines a rod or shaft element of a pedal rod for an automotive braking system, the ball being attachable to a braking system and the recess being attachable to a head member, (c) forming a second part by punching a second part work piece made of flat rolled steel to form a head member having a body portion formed with a through opening and having a reduced axially extending boss projecting out of an end wall which is complementary in size to the recess formed in the end of said first part, simultaneously forming in said second part when punching said second part recesses into opposite sides of said boss to accommodate and receive material displaced thereunto by and during a subsequent crimping step, (d) press fitting said boss of said second part into said recess of said first part so that the end wall of the first part is seated against the end wall of the second part, and (e) pressure crimping the first and second parts by displacing material from the first part into said boss of the second part, thereby to accomplish an assembly of the two parts into an integrated unit assembly to form a single pedal rod.

2. The method of claim 1, and further characterized by adding the following step between the steps of step (c) and step (d):

(f) plate coating the second part to form a protective coating thereon, thereby to render the second part more resistant to its ultimate operating environment.

3. The method of claim 2, and further characterized by, selectively changing the color of the coating applied in step (f) to effect a selective color coding of the single pedal rod.

4. The method of making a pedal rod which includes the steps of:

(a) shaping a metal rod work piece of generally cylindrical configuration to form an elongated body having a ball at one end and having successively a first cylindrical portion and a second larger cylindrical portion and an intermediate tapered portion there between and terminating in a radial end wall at the opposite end, (b) forming a non-threaded cylindrical recess in said radial end wall of said work piece, (c) shaping a metal head part to form a body having an end wall and a projecting non-threaded boss extending from said end wall and being sized and shaped for insertion into said recess in said radial end wall of said work piece, (d) inserting said boss of said head part into said recess thereby to form a subassembly whereby said work piece is a first outer part and said head part is a second inner part, and (e) crimping the inner and outer parts to form a crimped joint bonding the inner and outer parts into a unitary integrated unit pedal rod.

* * * * *